(12) United States Patent
Marquardt

(10) Patent No.: US 9,130,477 B2
(45) Date of Patent: Sep. 8, 2015

(54) HIGH VOLTAGE CONVERTER FOR LIMITING SHORT-CIRCUIT CURRENTS

(75) Inventor: Rainer Marquardt, Ottobrunn/Riemerling (DE)

(73) Assignee: Siemens Aktiengesellschaft, Munich (DE)

( * ) Notice: Subject to any disclaimer, the term of this patent is extended or adjusted under 35 U.S.C. 154(b) by 403 days.

(21) Appl. No.: 13/513,338

(22) PCT Filed: Nov. 18, 2010

(86) PCT No.: PCT/EP2010/067735
§ 371 (c)(1),
(2), (4) Date: Jun. 1, 2012

(87) PCT Pub. No.: WO2011/067120
PCT Pub. Date: Jun. 9, 2011

(65) Prior Publication Data
US 2012/0243282 A1 Sep. 27, 2012

(30) Foreign Application Priority Data
Dec. 1, 2009 (DE) .......................... 10 2009 057 288

(51) Int. Cl.
*H02M 7/217* (2006.01)
*H02M 7/49* (2007.01)
*H02M 7/483* (2007.01)

(52) U.S. Cl.
CPC ........ *H02M 7/49* (2013.01); *H02M 2007/4835* (2013.01)

(58) Field of Classification Search
USPC .................................. 363/127, 129, 132, 137
See application file for complete search history.

(56) References Cited

U.S. PATENT DOCUMENTS 5,999,388 A 12/1999 Asplund
7,269,037 B2 9/2007 Marquardt
(Continued)

FOREIGN PATENT DOCUMENTS

CN 101548461 A 9/2009
DE 101 03 031 A1 7/2002
(Continued)

OTHER PUBLICATIONS

Allebrod, et al., "New Transformerless, Scalable Modular Multilevel Converters for HVDC-Transmission", Power Electronics Specialists Converence, Jun. 15, 2008, pp. 176-179, IEEE, Piscataway, NJ, USA.

*Primary Examiner* — Jeffrey Sterrett
(74) *Attorney, Agent, or Firm* — Laurence A. Greenberg; Werner H. Stemer; Ralph E. Locher

(57) ABSTRACT

A submodule of a high-voltage inverter has a first sub-unit with a first energy storage device, a first series circuit of two power semiconductor switching units connected in parallel with the first energy storage device, each including a switchable power semiconductor, having the same pass-through direction, and each being conductive opposite the nominal pass-through direction. A first connection terminal is connected to the potential point between the power semiconductor switching units of the first series circuit. A second sub-unit has a second energy storage device, a second series circuit of two power semiconductor switching units connected in parallel with the second energy storage device, each including a switchable power semiconductor, having the same pass-through direction, and each being conductive opposite the nominal pass-through direction. A second connection terminal is connected to the potential point between the power semiconductor switching units of the second series circuit, limiting short circuit currents quickly, reliably, and effectively in case of a fault. The first and second sub-units are connected to each other by connections designed such that a current flow between the first connection terminal and the second connection terminal in both directions takes place only via the first energy storage device and/or the second energy storage device in a selected switching state of all power semiconductor switching units.

13 Claims, 2 Drawing Sheets

(56) References Cited

U.S. PATENT DOCUMENTS

| | | | |
|---|---|---|---|
| 8,587,248 B2* | 11/2013 | Hiller | 318/800 |
| 2005/0083716 A1 | 4/2005 | Marquardt | |
| 2008/0310205 A1* | 12/2008 | Hiller | 363/131 |
| 2010/0066174 A1 | 3/2010 | Dommaschk et al. | |
| 2012/0243282 A1* | 9/2012 | Marquardt | 363/132 |
| 2013/0215658 A1* | 8/2013 | Jakob et al. | 363/127 |

FOREIGN PATENT DOCUMENTS

| | | |
|---|---|---|
| EP | 1497911 A2 | 1/2005 |
| EP | 0867998 B1 | 3/2007 |
| RU | 2231903 C2 | 6/2004 |
| WO | 03/090331 A2 | 10/2003 |
| WO | 2008/067786 A1 | 6/2008 |

* cited by examiner

HIGH VOLTAGE CONVERTER FOR LIMITING SHORT-CIRCUIT CURRENTS

BACKGROUND OF THE INVENTION

Field of the Invention

The invention relates to a sub-module for forming a converter comprising a first sub-unit, which has a first energy storage device, a first series circuit—connected in parallel with the first energy storage device—formed by two power semiconductor switching units, which each have a power semiconductor that can be turned on and off and has the same forward direction, and are each conductive counter to said forward direction, and a first connection terminal, which is connected to the potential point between the power semiconductor switching units of the first series circuit, and a second sub-unit, which has a second energy storage device, a second series circuit—connected in parallel with the second energy storage device—formed by two power semiconductor switching units, which each have a power semiconductor that can be turned on and off and has the same forward direction, and are each conductive counter to said forward direction, and a second connection terminal, which is connected to the potential point between the power semiconductor switching units of the second series circuit.

The invention furthermore relates to a converter for example for high-voltage applications comprising power semiconductor valves, which in each case extend between an AC voltage connection and a DC voltage connection and form a bridge circuit, wherein each power semiconductor valve has a series circuit formed by two-pole sub-modules and each sub-module has at least one energy storage device and at least one power semiconductor circuit.

Such a sub-module and such a converter are already known from DE 101 03 031 A1. The converter described therein has power semiconductor valves connected to one another in a bridge circuit. Each of said power semiconductor valves has an AC voltage connection for connecting a phase of an AC voltage power supply system and a DC voltage connection, which can be connected to a pole of a DC voltage intermediate circuit. In this case, each power semiconductor valve consists of a series circuit formed by two-pole sub-modules each having a unipolar storage capacitor and a power semiconductor circuit connected in parallel with the storage capacitor. The power semiconductor circuit consists of a series circuit formed by power semiconductor switches, such as IGBTs or GTOs, for example, that can be turned on and off and are oriented in the same sense, with which power semiconductor switches a freewheeling diode is respectively connected in parallel in the opposite sense. One of two connection terminals of each sub-module is connected to the storage capacitor and the other connection terminal is connected to the potential point between the two power semiconductor switches that can be turned on and off. Depending on the switching state of the two drivable power semiconductor switches, either the capacitor voltage dropped across the storage capacitor or else a zero voltage can be applied to the two output terminals of the sub-module. On account of the series circuit formed by the sub-modules within the power semiconductor valve, a so-called multistage converter that impresses DC voltage is provided, wherein the level of the voltage steps is defined by the level of the respective capacitor voltage. Multistage or multipoint converters have the advantage over the two- or three-stage converters comprising central capacitor banks that high discharge currents are avoided upon a short circuit on the DC voltage side of the converter. Furthermore, in the case of multistage converters the outlay when filtering harmonics is reduced by comparison with two- or three-point converters.

Multipoint converters are also preferably suitable for constructing spatially extensive branched DC voltage power supply systems that are required particularly in the case of so-called off-shore wind farms and in connection with solar power networks in desert regions.

One important prerequisite for use of the converters in these fields is, however, reliable control of short circuits in the DC voltage power supply system. Expedient mechanical switches for extremely high DC voltages, which can switch high fault currents under load, are not available owing to fundamental physical problems. The technically achievable turn-off times and the switching overvoltage of mechanical switches are also troublesome.

EP 0 867 998 B1 describes the use of electronic power semiconductor switches in the DC voltage intermediate circuit of a high-voltage direct-current transmission system. However, the use of power semiconductor switches with DC voltages of a few hundred kilovolts is beset by the disadvantage that the high voltage necessitates a high number of power semiconductors connected in series. This also means, however, that a high on-state loss is also established at these components. Furthermore, it is necessary to provide overvoltage limiters connected in parallel with the power semiconductors, as a result of which the outlay is additionally increased. The overvoltage limiters generally do not have ideal limiter characteristic curves, and so the number of power semiconductors connected in series has to be designed to be even higher than would actually be required by the rated voltage. As a result of this overdimensioning, the on-state losses rise even further.

WO 2008/067786 A1 describes a multistage converter comprising series circuits formed by sub-modules, wherein each sub-module has a thyristor alongside a capacitor connected in parallel with a power semiconductor circuit. The thyristor is connected in parallel with a freewheeling diode of the power semiconductor circuit, which carries the entire short-circuit current in the case of a fault. The parallel thyristor is triggered in the case of a short circuit, thereby relieving the load on the freewheeling diode.

Alongside the abovementioned applications in the field of electrical energy transmission and distribution, multipoint converters that impress DC voltage are, of course, also outstandingly suitable for use in the field of drive technology.

The multipoint or multistage converters mentioned in the introduction have the disadvantage that a short-circuit current via the converter cannot be limited in both directions without additional measures, and so the semiconductors of the converter and external components in the shorted circuit are jeopardized or destroyed.

BRIEF SUMMARY OF THE INVENTION

It is an object of the invention to provide a sub-module and a converter of the type mentioned in the introduction with which short-circuit currents occurring in the case of a fault can be effectively limited and installation damage can be reliably avoided. Furthermore, faulty sections of a DC voltage power supply system are intended to be able to be de-energized as rapidly as possible and in this way isolated from the rest of the DC voltage power supply system.

Finally, in the case of a short circuit on the DC voltage side of the converter, the currents on the AC voltage side thereof are intended to be influenced as little as possible and triggering of the mechanical switches on the AC side is intended to be avoided.

Proceeding from the sub-module mentioned in the introduction, the invention achieves this object by virtue of the fact that the first sub-unit and the second sub-unit are connected to one another via connecting means configured such that in at least one selected switching state of all the power semiconductor switching units a current flow takes place between the first connection terminal and the second connection terminal in both directions only via the first energy storage device and/or the second energy storage device.

Proceeding from the converter mentioned in the introduction, the invention achieves this object by virtue of the fact that the sub-module is a sub-module according to the invention.

According to the invention, two sub-units each having an energy storage device, for example a capacitor, and a series circuit formed by two power semiconductor switching units are connected to one another via connecting means. The connecting means are embodied in a manner deviating from the prior art such that upon suitable driving of the power semiconductor switching units a current flow between the two connection terminals of the sub-module according to the invention always has to take place via at least one energy storage device. The energy storage device respectively affected always builds up, independently of the polarization of the clamping current, a back EMF that allows the current flow to decay rapidly. According to the invention, the selected switching state is dependent on the topology of the connecting means and the components thereof.

According to the invention, a high short-circuit current can be controlled without external additional switches. In contrast to the prior art, in the context of the invention it is ensured that high short-circuit currents through the converter itself in both directions can be avoided rapidly, reliably and effectively. Additional switches, for example in the DC voltage circuit connected to the converter, or else semiconductor switches connected in parallel with a power semiconductor of the sub-module, have become superfluous in the context of the invention. In the case of a fault, the sub-modules according to the invention virtually exclusively take up the liberated energy, such that the latter is completely absorbed. The energy absorption results in a back EMF and can be dimensioned in a defined and desired manner, such that unfavorably high voltages are avoided. Furthermore, according to the invention, no energy storage devices have to be charged in a controlled manner for restarting the converter. Rather, the converter according to the invention can resume its normal operation at any time.

Expediently, the connecting means have a switching unit. Said switching unit is in its interruption position, for example, in said selected state. In a departure therefrom, however, it is also possible according to the invention for the switching unit to be in its continuity position in the selected switching state. The design of the switching unit is arbitrary, in principle, in the context of this further development of the invention. Thus, it can be, for example, a mechanical switching unit, a suitable semiconductor switch, or else a power semiconductor switching unit that is identical to the rest of the power semiconductor units of the converter. The configuration of the power semiconductor switching units will be discussed in even more detail later.

Expediently, the connecting means have at least one potential isolating diode which is designed to maintain a voltage difference between the first sub-unit and the second sub-unit. In accordance with this advantageous further development, it is possible to increase the number of voltage steps that can be achieved. Thus, it is possible, for example, to generate the sum of the voltages dropped across the first energy storage device and across the second energy storage device at the connection terminals of the sub-module. Furthermore, in the case of this configuration of the invention, there is the possibility of generating, depending on the switching state of the power semiconductor switching units, only one voltage, that is to say either the voltage dropped across the first energy storage device or the voltage dropped across the second energy storage device, at connection terminals. In this way, the first and second sub-units can be treated, from the standpoint of control engineering, like two sub-modules in accordance with the prior art. Previously established control methods can thus also be applied to the sub-module according to the invention.

Furthermore, it is advantageous for the connecting means to have at least one damping resistor. The damping resistor or resistors support(s) the energy storage devices in taking up energy in the case of a fault. For this purpose, the damping resistors are interconnected with the remaining components of the connecting means in such a way that in said selected switching state a current flow passes at least partly also via the damping resistors independently of the polarity of the clamping current.

In accordance with one preferred configuration of the invention, the connecting means have an emitter connecting branch, which connects an emitter of a first power semiconductor switching unit of the first series circuit to an emitter of a first power semiconductor switching unit of the second series circuit and in which a potential isolating diode is arranged, a connector collecting branch, which connects a collector of the second power semiconductor switching unit of the first series circuit to a collector of the second power semiconductor switching unit of the second series circuit and in which a potential isolating diode is arranged, and a switching branch, in which a switching unit is arranged and which connects the cathode of the potential isolating diode of the emitter connecting branch to the anode of the potential isolating diode of the collector connecting branch. The emitter of a power semiconductor switching unit is also designated as source or cathode.

In accordance with one expedient further development in this regard, a respective damping resistor is arranged in the emitter connecting branch and in the collector connecting branch. As has already been explained, the switching unit of the switching branch can be chosen arbitrarily, in principle. What is essential is that the switching unit can be switched back and forth between an interrupter position, in which it interrupts a current flow, and an on-state position, in which it is conducting. It is thus possible, for example, to use as switching unit a mechanical circuit breaker, a cost-effective semiconductor switch or else a power semiconductor switching unit that is identical to the rest of the power semiconductor switching units of the sub-module. Other drivable power semiconductors can also be used as switching unit in the context of the invention.

As has already been explained, in accordance with this expedient further development, the selected switching state is attained if all the power semiconductor switching units and the switching unit are in their interrupter position. The clamping current is then always passed via at least one energy storage device or a damping resistor.

The switching unit should always be chosen such that the power loss arising at it during normal operation of the sub-module is as low as possible.

If all the power semiconductor switching units of the sub-module are designed identically, in other words if all the semiconductor switches are identical, they have a uniform reverse voltage and structure. This is advantageous in the case of high voltages, because only few semiconductor switches are suitable for extremely high voltages and powers. Uniform equipment of the sub-modules makes it possible to use the best suited and most powerful semiconductors in each case.

Expediently, each power semiconductor switching unit has a respective power semiconductor that can be turned on and off, with which power semiconductor a freewheeling diode is connected in parallel in the opposite sense. Such power semiconductors that can be turned off are, for example, commercially available IGBTs or GTOs and the like. These power semiconductors are usually used with a freewheeling diode connected in parallel in the opposite sense. However, reverse conducting power semiconductors can also be used according to the invention. Separate freewheeling diodes are then unnecessary.

Expediently, each energy storage device is configured as a capacitor, but in particular as a unipolar storage capacitor.

Further advantages and configurations are the subject matter of the following description of exemplary embodiments with reference to accompanying figures of the drawing, wherein identical reference signs refer to identically acting component parts and wherein

DESCRIPTION OF THE INVENTION

Figure 1:
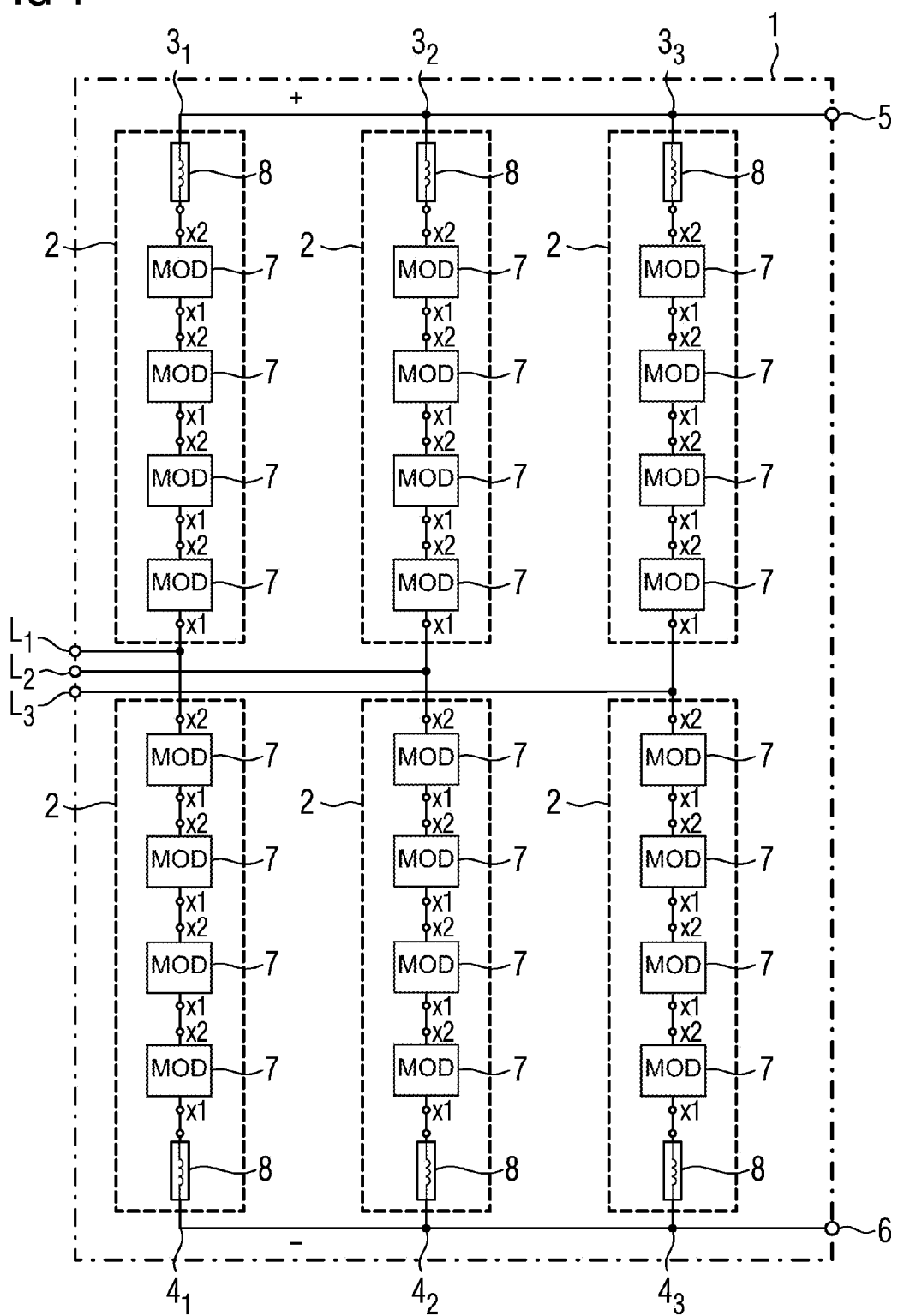
FIG. 1 schematically illustrates an exemplary embodiment of the converter according to the invention.

FIG. 1 shows an exemplary embodiment of the converter 1 according to the invention in a schematic illustration. It can be discerned that the converter 1 has power semiconductor valves 2 connected to one another in a bridge circuit. Each of the power semiconductor valves 2 extends between an AC voltage connection $L_1, L_2, L_3$ and a DC voltage connection $3_1, 3_2, 3_3$ and $4_1, 4_2, 4_3$, respectively. The DC voltage connections $3_1, 3_2, 3_3$ can be connected via a positive pole connection 5 to a positive pole and via a negative pole connection 6 to a negative pole of a DC voltage power supply system, not illustrated in the figures.

The AC voltage connections $L_1$, $L_2$ and $L_3$ are in each case connected to a secondary winding of a transformer, the primary winding of which is connected to an AC voltage power supply system, likewise not illustrated in the figures. An AC voltage connection $L_1, L_2, L_3$ is provided for each phase of the AC voltage power supply system. In the exemplary embodiment shown, the AC voltage power supply system is a three-phase system. Consequently, the converter 1 also has three AC voltage connections $L_1, L_2, L_3$. Mechanical circuit breakers are expediently provided between the AC voltage connection $L_1, L_2, L_3$ and the transformer in order to isolate the AC voltage power supply system from the converter 1 in the case of a fault. The circuit breakers are likewise not illustrated in FIG. 1.

In the exemplary embodiment shown, the converter 1 is part of a high-voltage direct-current transmission installation and serves for connecting AC voltage power supply systems in order to transmit high electrical powers between them. It should be mentioned at this juncture, however, that the converter can also be part of a so-called FACTS installation serving for system stabilization or serving to ensure a desired voltage quality. Furthermore, it is also possible to use the converter in accordance with FIGS. 1 and 2 in drive technology.

In FIG. 1 it can furthermore be discerned that each power semiconductor valve 2 has a series circuit composed of sub-modules 7 and also an inductor 8. In this case, each sub-module 7 has two connection terminals x1 and x2.

Figure 2:
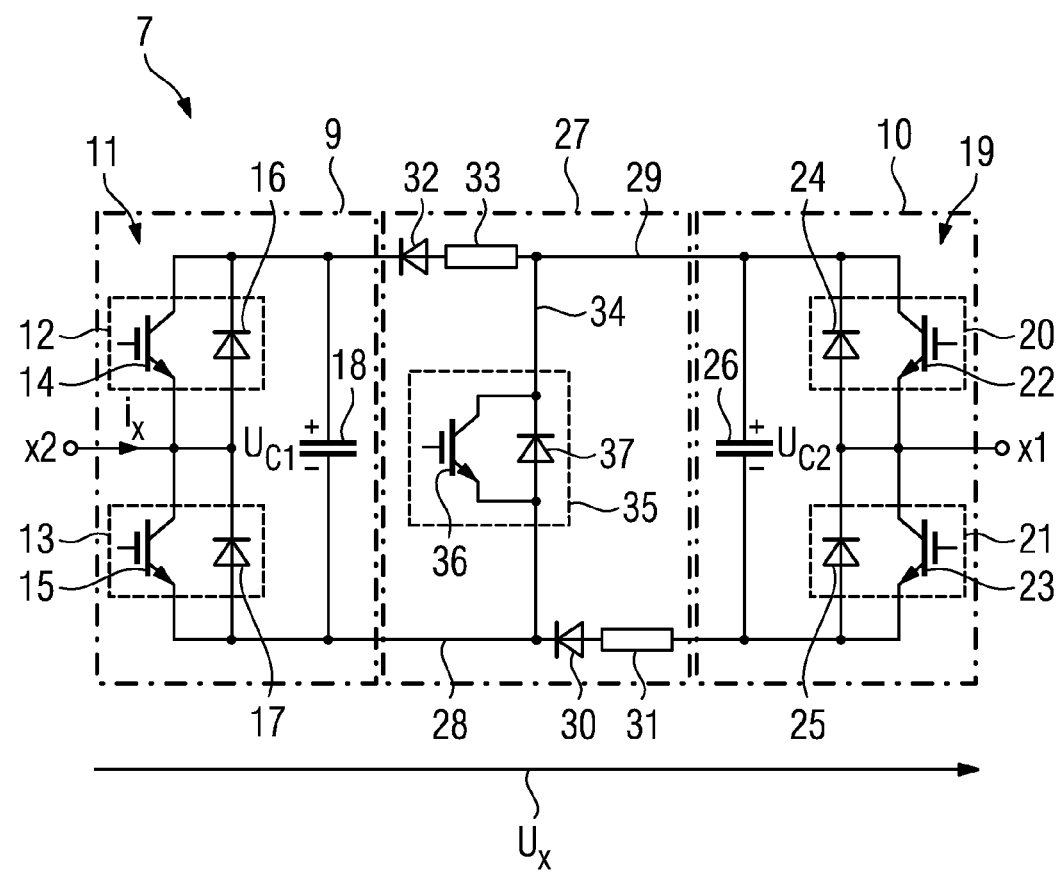
FIG. 2 illustrates in greater detail an exemplary embodiment of the sub-modules according to the invention.

FIG. 2 shows an exemplary embodiment of the sub-module 7 according to the invention in greater detail. It should be pointed out at this juncture that all of the sub-modules 7 illustrated schematically in FIG. 1 are constructed identically. FIG. 2 therefore shows the construction of all the sub-modules 7 and the converter 1 in representative fashion on the basis of one sub-module 7.

The sub-module 7 in accordance with FIG. 2 has a first sub-unit 9 and a second sub-unit 10, which are framed by a dashed line and are constructed identically. Thus, the first sub-unit 9 comprises a first series circuit 11 composed of power semiconductor switching units 12 and 13, which, in the exemplary embodiment shown, have a respective IGBT 14 and 15 as power semiconductor that can be turned on and off, and a respective freewheeling diode 16 and 17, which is connected in parallel with the respectively assigned IGBT 14, 15 in the opposite sense. The IGBTs 14, 15 have the same forward direction, that is to say are oriented in the same sense. The potential point between the power semiconductor switching units 12 and 13 is connected to a first connection terminal x2. The series circuit 11 is connected in parallel with the first capacitor 18 as first energy storage device, across which the voltage $U_{C1}$ is dropped.

The second sub-unit 10 comprises a second series circuit 19 comprised of a first power semiconductor switching unit 20 and a second power semiconductor switching unit 21, which have a respective IGBT 22 and 23 as power semiconductor that can be turned on and off. The IGBTs 22, 23 have the same forward direction in the series circuit 19, such that the power semiconductor switching units 20 and 21 are oriented in the same sense. A freewheeling diode 24 and 25 is connected in parallel with each IGBT 22 and 23, respectively, of the second series circuit 19 in the opposite sense. The second series circuit 19 is connected in parallel with a second capacitor 26, across which the voltage $U_{C2}$ is dropped. The potential point between the power semiconductor switching units 20 and 21 is connected to the second connection terminal x1.

The sub-units 9 and 10 are linked to one another via connecting means 27. The connecting means 27 have an emitter connecting branch 28 and also a collector connecting branch 29. The emitter connecting branch 28 connects the emitter of the IGBT 15 of the first series circuit 11 to the emitter of the IGBT 23 of the second series circuit 19. The collector connecting branch 29, by contrast, connects the collector of the IGBT 14 of the first series circuit 11 to the collector of the IGBT 22 of the second series circuit 19. A potential isolating diode 30 and a limiting resistor 31 are arranged in the emitter connecting branch 28. The collector connecting branch 29 likewise has a potential isolating diode 32 and also a limiting resistor 33. The emitter connecting branch 28 is connected to the collector connecting branch 29 via a switching branch 34, in which a switching unit 35 is arranged. In the exemplary embodiment shown, the switching unit is realized as a power semiconductor switching unit 35 and comprises an IGBT 36 and a freewheeling diode 37 connected in parallel therewith in the opposite sense. In this case, the switching branch 34 connects the cathode side of the potential isolating diode 30 to the anode side of the potential isolating diode 32, the limiting resistor 33 arranged between said anode and the switching branch 34 having been disregarded.

The mode of operation of the circuit of the sub-modules 7 is explained below. Firstly, it should be pointed out that the required reverse voltage of all the power semiconductors, that is to say both of the freewheeling diodes 16, 17, 24 and 25 and of the power semiconductor switches 14, 15, 22 and 23 that can be turned on and off, depends on the maximum voltage of the two unipolar storage capacitors 18 and 26, which is identical in the exemplary embodiment chosen. A disadvantageous overdimensioning of the reverse voltages of said power semiconductors is avoided in this way.

Overall it is possible to differentiate between a plurality of switching states that differ from one another with regard to the clamping voltages $U_x$.

In one switching state 1 picked out by way of example, the clamping voltage $U_x$ dropped across the connection terminals, x2 and x1 is equal to zero independently of the direction of the clamping current. In this switching state, the IGBTs 15, 22 and 36 are situated in their on-state position, in which a current flow is made possible in the forward direction via the respective IGBT. The remaining IGBTs, that is to say the IGBTs 14 and 23, by contrast, are situated in their blocking position, such that a current flow via said IGBTs is interrupted. Given a positive current direction $i_x$ ($i_x$ positive), which is indicated by the arrow at the first connection terminal x2 in FIG. 2, the power semiconductors 15, 37 and 22 are current-carrying. Given a negative current direction ($i_x$ negative), the power semiconductors 24, 36 and 17 are current-carrying.

The following table summarizes the switching states preferably used.

| Switching state | $i_x$ | IGBT 15 | IGBT 14 | IGBT 23 | IGBT 22 | IGBT 36 | $U_X$ | $W_{C1}$ | $W_{C2}$ |
|---|---|---|---|---|---|---|---|---|---|
| 1 | negative | 1 | 0 | 0 | 1 | 1 | 0 | 0 | 0 |
|   | positive | 1 | 0 | 0 | 1 | 1 | 0 | 0 | 0 |
| 2 | negative | 0 | 1 | 0 | 1 | 1 | $+U_{C1}$ | $-1$ | 0 |
|   | positive | 0 | 1 | 0 | 1 | 1 | $+U_{C1}$ | $+1$ | 0 |
| 3 | negative | 0 | 1 | 1 | 0 | 1 | $+(U_{C1}+U_{C2})$ | $-1$ | $-1$ |
|   | positive | 0 | 1 | 1 | 0 | 1 | $+(U_{C1}+U_{C2})$ | $+1$ | $+1$ |
| 4 | negative | 1 | 0 | 1 | 0 | 1 | $+U_{C2}$ | 0 | $-1$ |
|   | positive | 1 | 0 | 1 | 0 | 1 | $+U_{C2}$ | 0 | $+1$ |
| 5 | negative | 0 | 0 | 0 | 0 | 0 | $-(U_{C1}+U_{C2})/2$ | $+1$ | $+1$ |
|   | positive | 0 | 0 | 0 | 0 | 0 | $+(U_{C1}+U_{C2})$ | $+1$ | $+1$ |

The columns $W_{C1}$ and $W_{C2}$ are intended to illustrate whether the storage capacitors 18 and 26 take up or output energy, where +1 stands for taking up energy and −1 stands for outputting energy.

It can be gathered from the table that a positive voltage is always generated at the connection terminals x2 and x1 in the switching states 2, 3 and 4. This holds true independently of the direction of the clamping current. Thus, by way of example, the capacitor voltage $U_{C1}$ or the capacitor voltage $U_{C2}$ or else the sum of the capacitor voltages $U_{C1}+U_{C2}$ can be dropped across the connection terminals.

In the switching state 5, all the drivable power semiconductors, that is to say the IGBTs 14, 15, 22, 23 and 36, are in their interrupter position, such that a current flow via the IGBTs is interrupted. In this switching state, the clamping voltage $U_x$ always forms a back EMF independently of the polarity of the clamping current $i_x$, such that the sub-module 7 always absorbs energy. Given a negative current direction, $i_x$ negative, a negative back EMF is generated by the parallel circuit formed by the storage capacitors 26 and 18 and also by the voltage drop across the damping resistors 30 and 32. If the capacitor voltages $U_{C1}$ and $U_{C2}$ do not correspond exactly, they are automatically balanced. In the switching state 5, the following holds true to a good approximation:

$$U_x = \frac{-(U_{c_1} + U_{c_2})}{2} - U_R$$

where $U_R$ corresponds to the voltage drop across the damping resistors 32 and 30.

Given a positive current direction, a positive back EMF $$U_x = +(U_{C1}+U_{C2})$$

is generated. Here, too, a current flow can take place only with the charging of the storage capacitors 18 and 25, respectively. In this case, it is advantageous that the current that occurs is passed via both capacitors, since then there occurs at the latter a lower overvoltage than if only one capacitor had to take up the energy.

It can furthermore be gathered from the table presented above that with the sub-module 7 and its two sub-units 9 and 10 it is possible to generate the same output voltages at the output terminals as in the case of two series-connected sub-modules in accordance with the prior art (DE 101 03 031 A1). The sub-units 9, 10 correspond as it were to a respective sub-module in accordance with the prior art. In other words, the sub-module according to the invention in accordance with FIG. 2 can be driven in the same way as two sub-modules in accordance with the prior art. All known control methods can therefore still be employed. In the narrower sense, however, the secondary condition exists that the number of sub-modules connected in series in accordance with the prior art must always yield an even number. In the case of high-voltage applications, however, the number of sub-modules connected in series is so large that said secondary condition is unimportant.

The switching state 5 can be used for complete current reduction in the case of a fault. If all sub-modules 7 are converted to this switching state, the branch currents of the converter 1 and in a resulting manner also the currents on the AC voltage side and DC voltage side, on account of the sum of the back EMFs of all the series-connected sub-modules 7, are reduced very rapidly to zero. The speed of this current reduction results from the abovementioned back EMF and the inductances present in total in the electric circuits. It is typically of the order of magnitude of a few milliseconds in the exemplary embodiment shown.

The dead time until the beginning of the current reduction is substantially dependent on the response time of the switching unit 35. If a power semiconductor switching unit in accordance with FIG. 2 is used for the switching unit 35, said dead time is negligible. The dead time is then substantially owing to the inertia of the various measuring sensors and current conductors used to identify a disturbance case. This inertia of this measured value detection is at the present time typically in the range of a few tens of microseconds.

The advantages of the sub-module according to the invention and of the converter 1 according to the invention can be summarized as follows: Firstly, the time period until complete reduction of a short-circuit current which occurs in the case of a fault is very short. Consequently, switches provided on the AC voltage side of the converter 1 do not even have to be triggered in the first place. Both the current on the AC voltage side and the current on the DC voltage side exceed the rated current only insignificantly. In contrast to the prior art, the power semiconductors of the sub-modules do not have to be protected by thyristors or other bridging elements. The reliability of the current turn-off is very high, because a redundancy is ensured by the large number of series-connected sub-modules in the power semiconductor valves of the converter 1. In connection with reliability, it should also be explained that the converter 1 is in operation continuously with all its components and is constantly monitored metrologically. Such functional reliability is not afforded in comparable devices for current reduction in cases of fault, which are activated only in such a case of fault.

A further essential advantage of the invention is that "switching back" to normal operation is possible at any time, such that, even in the case of faulty unnecessary triggering or detection, the negative effects on installation operation can be minimized.

With the aid of a converter 1 according to the invention it is furthermore possible, even in a branched DC voltage power supply system, to bring the DC voltage currents rapidly to zero. In the DC voltage circuit, isolation without current, for example by means of vacuum interrupters or antiparallel thyristors, is possible in this way. In the case of branched DC voltage power supply systems, it is also necessary, of course, for the remaining converters connected to the DC voltage power supply system to reduce the current, that is to say to undergo transition rapidly into the switching state 5 of the sub-modules 7. A faulty system section of the DC voltage power supply system can thus be isolated simply and cost-effectively from the rest of the DC voltage power supply system without current by means of known mechanical switches. The faulty system section can then "pause" for the purpose of deionization or fault localization and later be started up by its assigned converter. In a very short time, the remaining converters can reactivate the entire DC voltage power supply system.

The invention claimed is:

1. A sub-module for forming a converter, comprising:
a first sub-unit having:
a first energy storage device;
a first series circuit connected in parallel with said first energy storage device, said first series circuit being formed by two power semiconductor switching units, each having a power semiconductor that can be turned on and off, having a common forward direction, and each being conductive counter to the forward direction; and
a first connection terminal connected to a potential node between said power semiconductor switching units of said first series circuit;
a second sub-unit having:
a second energy storage device;
a second series circuit connected in parallel with said second energy storage device, said second energy storage device being formed by two power semiconductor switching units, each having a power semiconductor that can be turned on and off, having a common forward direction, and each being conductive counter to the forward direction; and
a second connection terminal connected to a potential node between said power semiconductor switching units of said second series circuit;
a connecting device connecting said first sub-unit and said second sub-unit to one another, said connecting device being configured such that, in at least one selected switching state of all said power semiconductor switching units, a current flows between said first connection terminal and said second connection terminal in both directions only through said first energy storage device and/or said second energy storage device, said connecting device including:
an emitter connecting branch connecting an emitter of a first power semiconductor switching unit of said first series circuit to an emitter of a first power semiconductor switching unit of said second series circuit and having a potential isolating diode connected therein;
a collector connecting branch connecting a collector of a second power semiconductor switching unit of said first series circuit to a collector of a second power semiconductor switching unit of said second series circuit and having a potential isolating diode connected therein; and
a switching branch containing a switching unit and connecting a cathode of said potential isolating diode of said emitter connecting branch to an anode of said potential isolating diode of said collector connecting branch.

2. The sub-module according to claim 1, wherein said connecting device comprises a switching unit.

3. The sub-module according to claim 2, wherein said switching unit is selected from the group consisting of a mechanical switching unit, a semiconductor switch, and a power semiconductor switching unit.

4. The sub-module according to claim 1, wherein said connecting device comprises at least one potential isolating diode configured to maintain a voltage difference between said first sub-unit and said second sub-unit.

5. The sub-module according to claim 1, wherein said connecting device comprises at least one damping resistor.

6. The sub-module according to claim 1, which comprises damping resistors connected in said emitter connecting branch and in said collector connecting branch.

7. The sub-module according to claim 1, wherein, in the selected switching state, all said power semiconductor switching units are in interrupter positions thereof.

8. The sub-module according to claim 7, wherein said connecting device comprises at least one switching unit which, in the selected switching state, is in its interrupter position.

9. The sub-module according to claim 1, wherein said power semiconductor switching units are reverse conducting power semiconductor switches that can be turned on and off.

10. The sub-module according to claim 1, wherein each said power semiconductor switching unit has a respective power semiconductor that can be turned on and off, and wherein a freewheeling diode is connected with said power semiconductor in parallel in an opposite sense.

11. The sub-module according to claim 1, wherein each energy storage device is a unipolar storage capacitor.

12. A converter, comprising:
- power semiconductor valves in each case extending between an AC voltage connection and a DC voltage connection and forming a bridge circuit;
- each said power semiconductor valve having a series circuit formed by two-pole sub-modules, and each sub-module having at least one energy storage device and at least one power semiconductor circuit, and wherein the sub-module is a sub-module according to claim 1.

13. The converter according to claim 12, configured for high-voltage applications.

* * * * *